United States Patent
Danziger et al.

(10) Patent No.: US 6,434,311 B1
(45) Date of Patent: Aug. 13, 2002

(54) REDUCING MODE INTERFERENCE IN TRANSMISSION OF A HIGH ORDER MODE IN OPTICAL FIBERS

(75) Inventors: Yochay Danziger, Dallas, TX (US); Eran Herman, Rishon Le Zion (IL); Uri Levy, Rehovot (IL); Michael Rosenblit, Ashdod (IL)

(73) Assignee: LaserComm Inc., Plano, TX (US)

( * ) Notice: Subject to any disclaimer, the term of this patent is extended or adjusted under 35 U.S.C. 154(b) by 0 days.

(21) Appl. No.: 09/481,428

(22) Filed: Jan. 12, 2000

Related U.S. Application Data (63) Continuation-in-part of application No. 09/464,629, filed on Dec. 17, 1999.
(60) Provisional application No. 60/138,369, filed on Jun. 10, 1999.

(51) Int. Cl.[7] .............................. G02B 6/14; G02B 6/16; G02B 6/22
(52) U.S. Cl. .......................... 385/126; 385/123; 385/29
(58) Field of Search ................................. 385/123, 126, 385/29

(56) References Cited

U.S. PATENT DOCUMENTS

| | | | |
|---|---|---|---|
| 4,372,648 A | 2/1983 | Black | 350/96.33 |
| 4,447,124 A | 5/1984 | Cohen | 350/96.3 |
| 4,723,828 A | 2/1988 | Garel-Jones et al. | 350/96.15 |
| 5,121,460 A | 6/1992 | Tumminelli et al. | 385/126 |
| 5,261,016 A | 11/1993 | Poole | 385/28 |
| 5,790,735 A | 8/1998 | Oleskevich et al. | 385/127 |
| 5,818,630 A | 10/1998 | Fermann et al. | 359/341 |
| 5,828,802 A | 10/1998 | Stolen et al. | 385/27 |
| 5,926,600 A * | 7/1999 | Pavlath | 385/142 |

FOREIGN PATENT DOCUMENTS

| | | |
|---|---|---|
| EP | 783 117 A2 | 7/1997 |
| EP | 783 117 A3 | 3/2000 |
| JP | 62275203 | 11/1987 |
| WO | WO 99/54767 | 10/1999 |

OTHER PUBLICATIONS

International Search Report for International Patent Application No. PCT/US00/15719, 7 pages, Oct. 9, 2000.

* cited by examiner

Primary Examiner—John D. Lee
Assistant Examiner—Jerry T Rahll
(74) Attorney, Agent, or Firm—1e;.5qSimon Mark Kahn (57) ABSTRACT

An optical waveguide supporting a plurality of modes including an annulus which attenuates a desired mode to a lesser degree than any other mode in the plurality of modes. In one embodiment, the annulus is disposed in the core of the waveguide. In another embodiment, the annulus is concentric about the core. In another embodiment, the annulus has a predetermined width and radius. In yet another embodiment the optical waveguide includes an annulus that is disposed at a radial position corresponding to a region in the core in which the desired mode has substantially no energy. In yet another embodiment the desired mode includes the $LP_{02}$ mode. In another embodiment, the annulus includes a scattering material. In still another embodiment, the annulus includes a conductive dopant material. Another embodiment includes a sharp change of refractive index within the core. Still other embodiments include disposing a region of increased refractive index in the core of the waveguide to attenuate undesired modes. Another embodiment includes disposing a region of decreased refractive index in the core of the waveguide to attenuate undesired modes. Other embodiments include combinations of annuli. These combinations of annuli can include, for example, absorbing annuli, scattering annuli, annuli comprising conductive dopant material, regions of increased refractive index, and regions of decreased refractive index or any combination thereof.

22 Claims, 13 Drawing Sheets

REDUCING MODE INTERFERENCE IN TRANSMISSION OF A HIGH ORDER MODE IN OPTICAL FIBERS

CROSS-REFERENCE TO RELATED APPLICATIONS

This application is a continuation-in-part application of U.S. patent application Ser. No. 09/464,629 filed Dec. 17, 1999, entitled "REDUCING MODE INTERFERENCE IN TRANSMISSION OF LP02 MODE IN OPTICAL FIBERS" and claims priority to provisional U.S. patent application Ser. No. 60/138,369 which was filed on Jun. 10, 1999.

FIELD OF THE INVENTION

The invention relates to optical fibers for use in communication systems and, more specifically, to devices which reduce mode interference in the fiber.

BACKGROUND OF THE INVENTION

Propagating a high order mode in optical fiber transmission systems can have advantages over propagating a fundamental or basic mode. For example, propagating a high order mode can improve the overall performance of transport systems. One way performance is improved is due to the choice of fiber that will support the propagation of the high order mode. A significant advantage of this high order mode fiber is that it can be designed to have strong negative dispersion and high effective areas. Therefore, it can be used to compensate for chromatic dispersion. There is a drawback to these high order mode fibers, however. Propagating a high order mode can generate interferometric noise due to mode coupling in the fiber. To substantially reduce this noise, it would be advantageous to propagate a single high order mode.

Various methods have been suggested for transforming or coupling light energy in the fiber from one mode to another different mode. For example, a long period fiber grating may be used to transfer energy from one mode to another mode. Unfortunately, this method can also transform some of the light energy from one mode to other undesirable modes. Other methods can have the same undesired results.

Energy transfer or coupling from the desired high order modes to undesirable modes can also occur due to inhomogeniety of the high order mode fiber. These inhomogenieties can occur in the manufacturing process. Inhomogenieties can also appear due to imperfect splicing of the fiber, periodic bending (micro bending), and scattering mechanisms (i.e., Riley scattering), for example.

The result of imperfect mode transformation and mode coupling in the fiber is that undesirable modes will propagate in the fiber. These modes can interfere with the desired mode through a process called multipath interference (MPI). MPI causes significant reduction in signal quality by distorting its phase and amplitude. Therefore, in order to realize reasonable signal quality, the ratio between the energy transmitted through the undesired modes to the energy transmitted through the desired mode should be below 1:10000 or approximately 40 dB. This ratio should be maintained for any length of high order mode fiber being used in order to maintain reasonable signal quality.

It is therefore desirable to suppress the undesired modes in a high order mode fiber in order to improve the signal quality in the fiber.

SUMMARY OF THE INVENTION

The invention relates to an optical waveguide for attenuating undesired modes. In one embodiment, the waveguide includes either an absorbing or scattering annulus disposed substantially within a core of the waveguide. In another embodiment, the absorbing or scattering annulus is concentric about the core of the waveguide. In another embodiment, an optical fiber is used as a waveguide and the optical fiber supports the $LP_{02}$ mode. In still other embodiments, the width and the radius of the absorbing or scattering annulus are predetermined so as to attenuate undesired modes. In another embodiment, the annulus is disposed at a radial position corresponding to a region in the core in which the desired mode has substantially no energy. Other embodiments include a plurality of absorbing and/or scattering annuli. In another embodiment, the absorbing or scattering annulus includes titanium. In still another embodiment, the absorbing or scattering annulus includes boron. In still another embodiment, the absorbing or scattering annulus includes Erbium. In still other embodiments, the annulus includes any suitably absorbing material. In other embodiments, the annulus includes any suitably scattering material. In still another embodiment, the annulus includes any suitably conductive material dopant.

In another embodiment, the optical waveguide includes a multimode waveguide having a core and supporting a plurality of modes, the core having a core radius and a core refractive index. The optical waveguide further includes a sharp change of refractive index within the core. The refractive index discontinuity in another embodiment occurs at a radial position which is predetermined so as to attenuate a desired mode to a lesser degree than any other mode in the plurality of modes. The sharp change in index of refraction in the core, in one embodiment, comprises a discontinuity in the refractive index profile of the core.

In another embodiment, the optical waveguide includes a multimode waveguide having a core and supporting a plurality of modes, the core having a core radius and a core refractive index. The optical waveguide further includes a region of increased refractive index disposed within the core, and the region of increased refractive index step has a refractive index which is greater than the core refractive index and the radial position of the region of increased refractive index is predetermined so as to attenuate a desired mode to a lesser degree than any other mode in the plurality of modes. Another embodiment includes a plurality of regions of increased refractive index within the waveguide.

In another embodiment, the optical waveguide includes a multimode waveguide having a core and supporting a plurality of modes, the core having a core radius and a core refractive index. The waveguide further includes a region of decreased refractive index disposed within the core, and the region of decreased refractive index has a refractive index which is less than the core refractive index and the radial position of the region of decreased refractive index is predetermined so as to attenuate a desired mode to a lesser degree than any other mode in the plurality of modes. Another embodiment includes a plurality of regions of decreased refractive index within the waveguide.

In one embodiment, the desired mode is a high order mode. In another embodiment, the desired mode is an even high order mode. In yet another embodiment, the desired mode is the $LP_{02}$ mode. Other embodiments include combinations of annuli. These combinations of annuli can include, for example, absorbing annuli, scattering annuli, annuli comprising conductive dopant material, regions of increased refractive index, and regions of decreased refractive index or any combination thereof.

In one embodiment of the invention, a method for attenuating undesired modes includes providing a multimode waveguide having a core, transmitting an optical signal having a plurality of modes through the waveguide, and absorbing the desired mode to a lesser degree than any other mode in the plurality of modes.

BRIEF DESCRIPTION OF THE DRAWINGS

This invention is pointed out with particularity in the appended claims. The above and further advantages of this invention may be better understood by referring to the following description taking conjunction with the accompanying drawings, in which:

DETAILED DESCRIPTION

Figure 1:
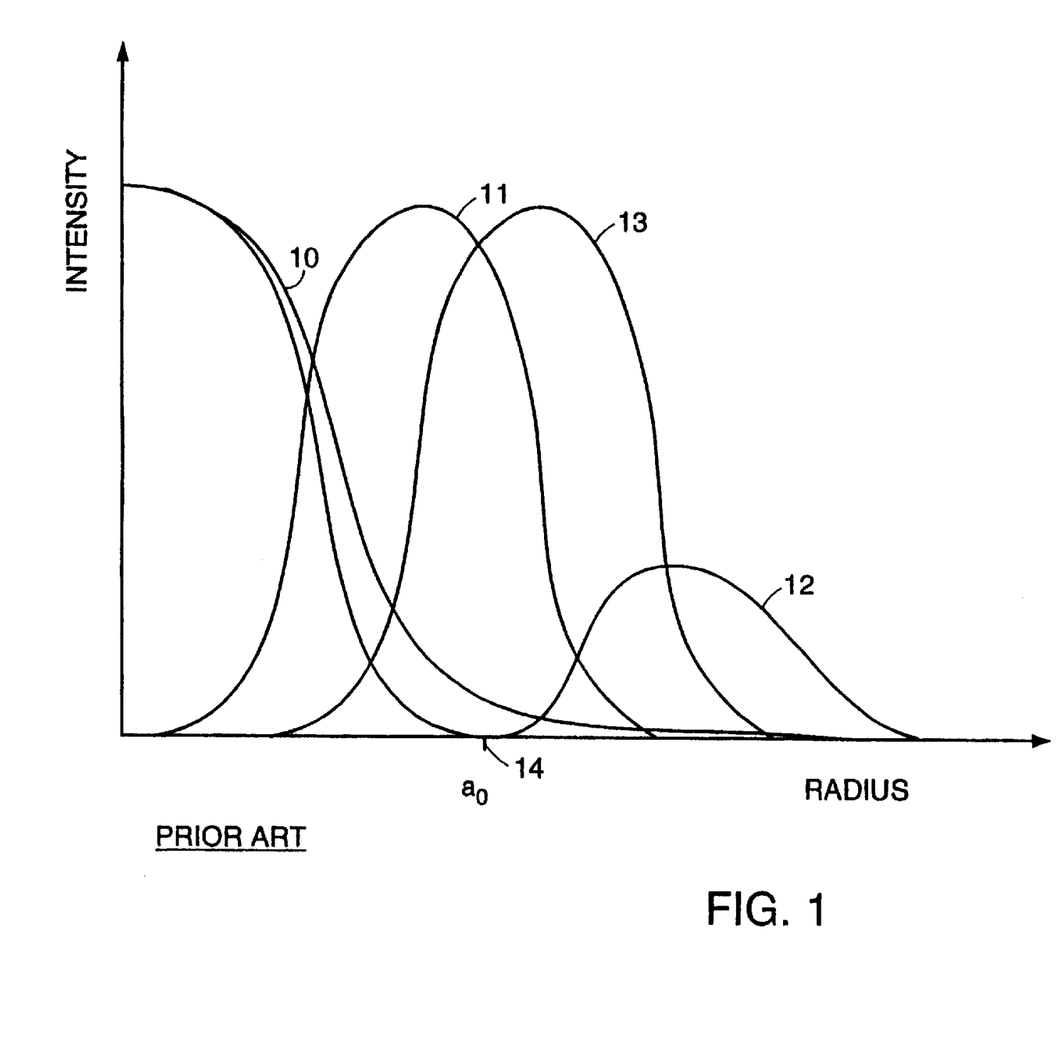
FIG. 1 illustrates the intensity distribution of the $LP_{01}$, $LP_{11}$, $LP_{02}$, and $LP_{21}$ modes in a conventional step index fiber known to the prior art.

Referring now to FIG. 1, therein is illustrated the intensity distribution of the $LP_{01}$ mode (10), $LP_{11}$ mode (11), $LP_{02}$ mode (12), and $LP_{21}$ mode (13) in a conventional step index fiber known to the prior art. The intensity of each mode varies with the radius of the fiber. For example, the $LP_{01}$ mode (10) has its maximum intensity close to the center of the fiber core and its intensity trails off to a minimum value as it gets deeper into the cladding of the fiber.

One realization of the present invention is that each of the modes $LP_{01}$, $LP_{11}$, $LP_{02}$, and $LP_{21}$, vary in intensity at different radii in the fiber core. Another realization of the present invention is that the most favorable modes for the application of compensation for chromatic dispersion are the even modes ($LP_{01}$, $LP_{02}$, $LP_{03}$ ...) because their properties are independent of polarization when being transmitted in a circularly symmetric fiber. Unwanted mode interference in the transmission of the $LP_{02}$ mode in an optical fiber can be reduced by reducing mode coupling or by selectively attenuating undesired modes. Please note that the terms "mode" and "spatial mode" are interchangeable throughout the application.

Selective attenuation can be achieved by changing the radial transmission profile of the optical fiber. Referring back to FIG. 1, the radial distribution of the intensity of the $LP_{02}$ mode (12) is shown. The $LP_{02}$ mode (12) has maximal intensity close to the center of the fiber core and no intensity at the radial distance $a_0$ 14. All other guided modes (10), (11), and (13) have significant energy at this radial distance $a_0$ 14.

Figure 2:
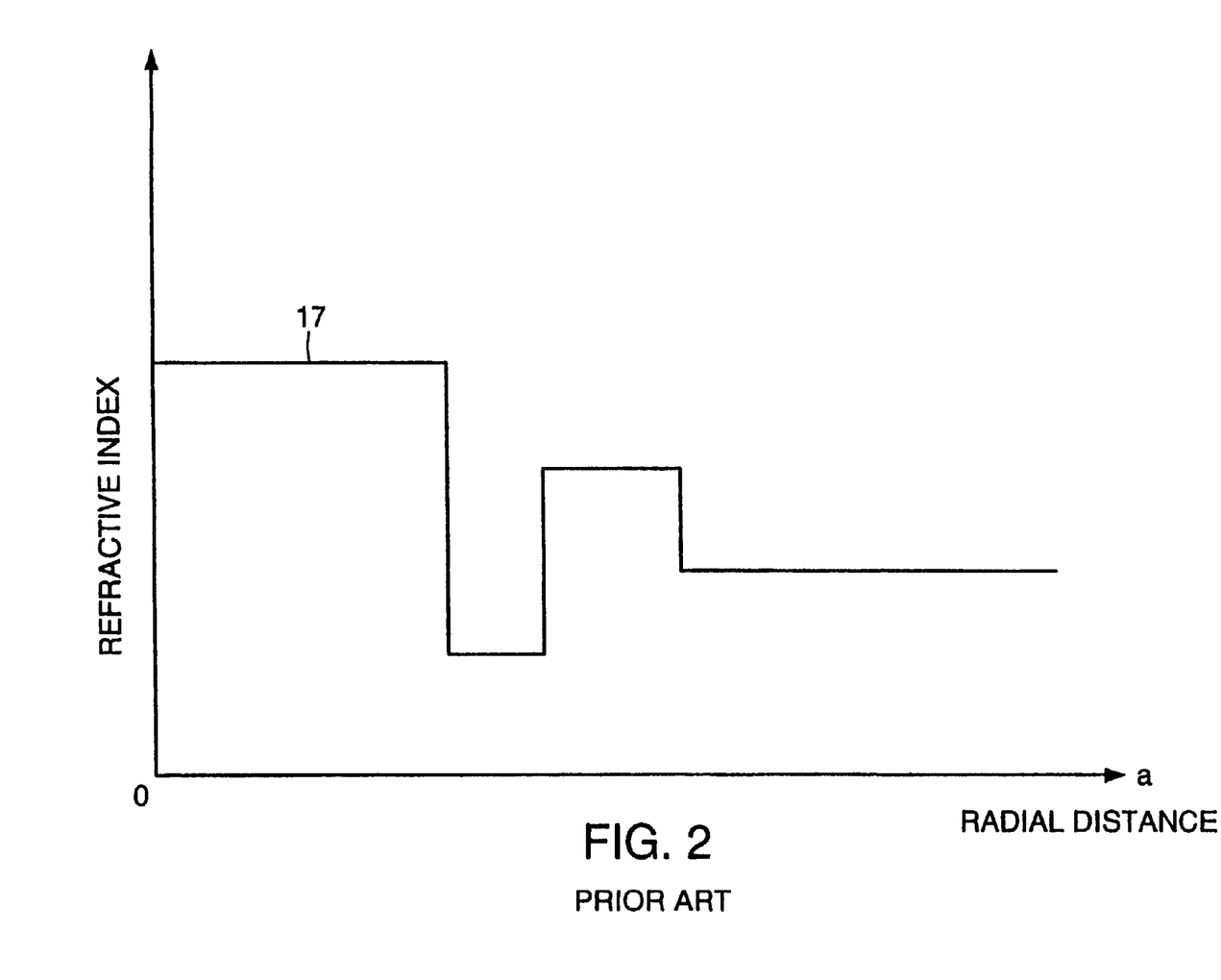
FIG. 2 shows an approximation of the variation in index of refraction with radial distance for a multiclad approximated as a step profile known to the prior art.

FIG. 2 illustrates a rectangular approximation of the variation in index of refraction with radial distance for a fiber known to the prior art. This fiber has a profile 17 that can support both high and low order modes in the fiber.

Figure 3A:
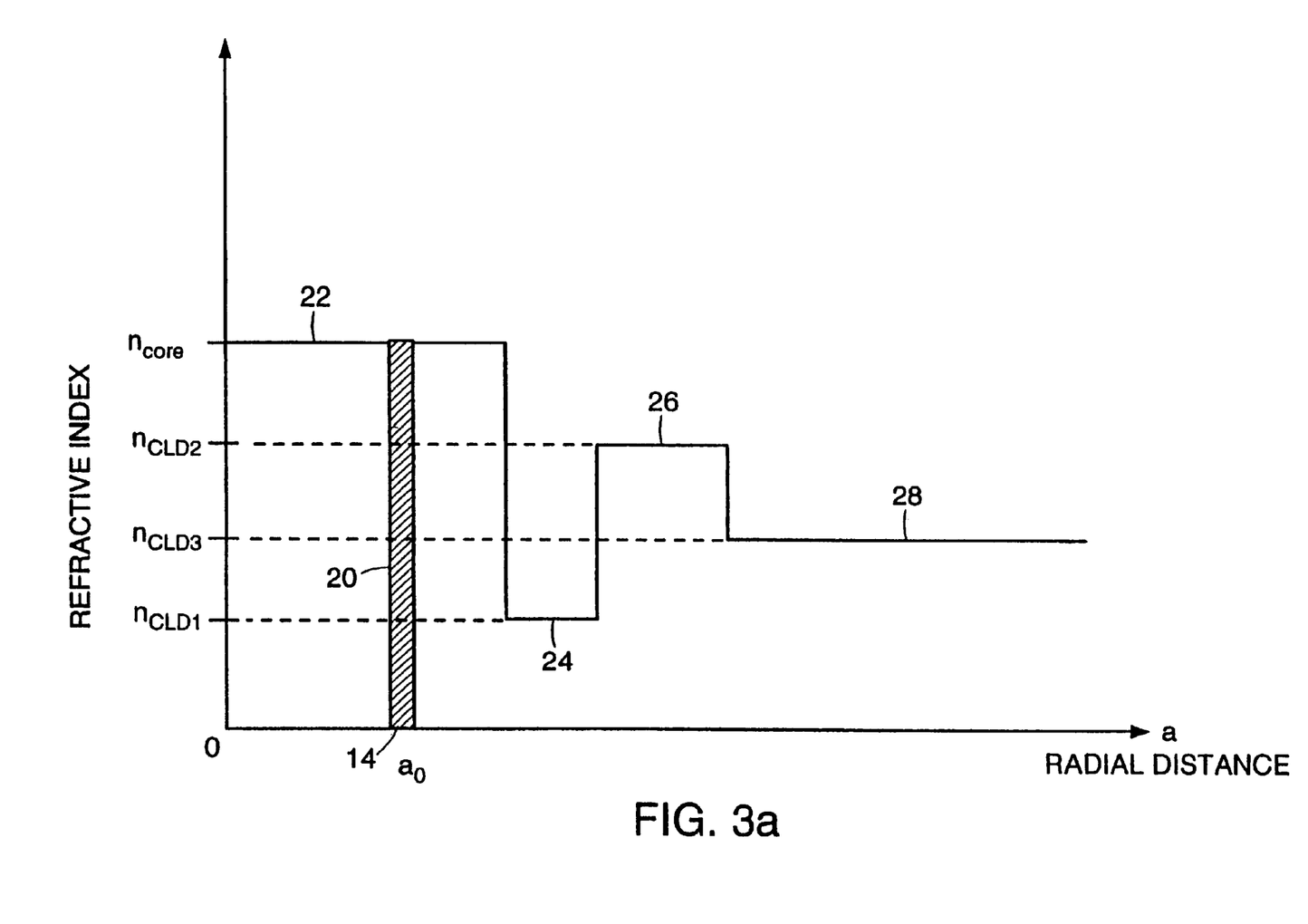
FIG. 3a shows an approximation of the variation in index of refraction with radial distance for one embodiment of an optical fiber including an absorbing annulus according to the present invention.

Referring now to FIG. 3a, therein is shown an embodiment of the index profile of the present invention including an absorbing annulus 20. The absorbing annulus 20 in one embodiment is an absorbing ring introduced at the radial distance $a_0$ 14. In this embodiment, the index profile shows several index changes. The core 22 has an index $n_{core}$. The first cladding 24 has an index $n_{cld1}$. The second cladding 26 steps up in index to $n_{cld2}$ and the next cladding section 28 of the fiber has an index $n_{cld3}$. The annulus 20 can be used to significantly attenuate all modes except the $LP_{02}$ mode (12). As noted above with reference to FIG. 1, at radial distance $a_0$ 14 the $LP_{02}$ mode (12) has minimum intensity. Therefore, it will not be significantly attenuated by the absorbing annulus. Precise positioning of the absorbing annulus can be achieved through the use of conventional and specialized manufacturing methods known to those skilled in the art such as MCVD and OVD.

Figure 3B:
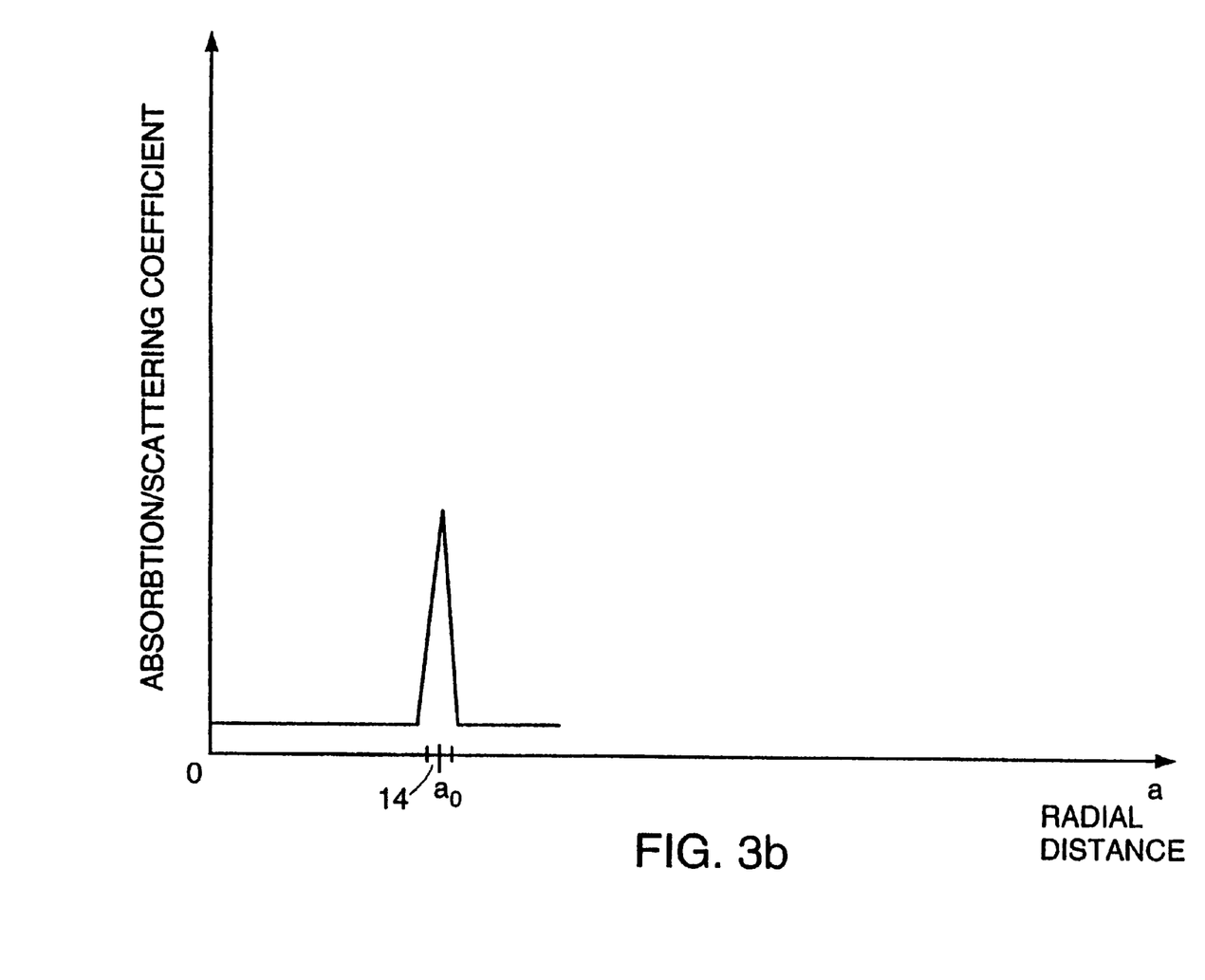
FIG. 3b shows an approximation of the variation in the absorption or scattering coefficient with radial distance for one embodiment of an optical fiber including an annulus according to the present invention.

Referring now to FIG. 3b, therein is shown an embodiment of the absorption or scattering coefficient in the core area of the present invention including an annulus. The horizontal axis represents radial distance and the left portion of the diagram represents the center of the fiber and the right portion represents the first cladding. The vertical axis represents the absorption or scattering coefficient in arbitrary units. The absorption or scattering coefficient shows a large peak at the radial distance $a_0$ 14, indicative of the significant attenuation of the annulus.

It should be understood that a similar result may be obtained in another embodiment by inserting a scattering annulus in place of the above described absorbing annulus. The scattering annulus can be implemented in one embodiment by utilizing a scattering or conductive material dopant placed substantially at the radial distance $a_0$ 14, or at whatever point unwanted energy exists. The scattering annulus in one embodiment has a sharp discontinuity in refractive index.

Figure 3C:
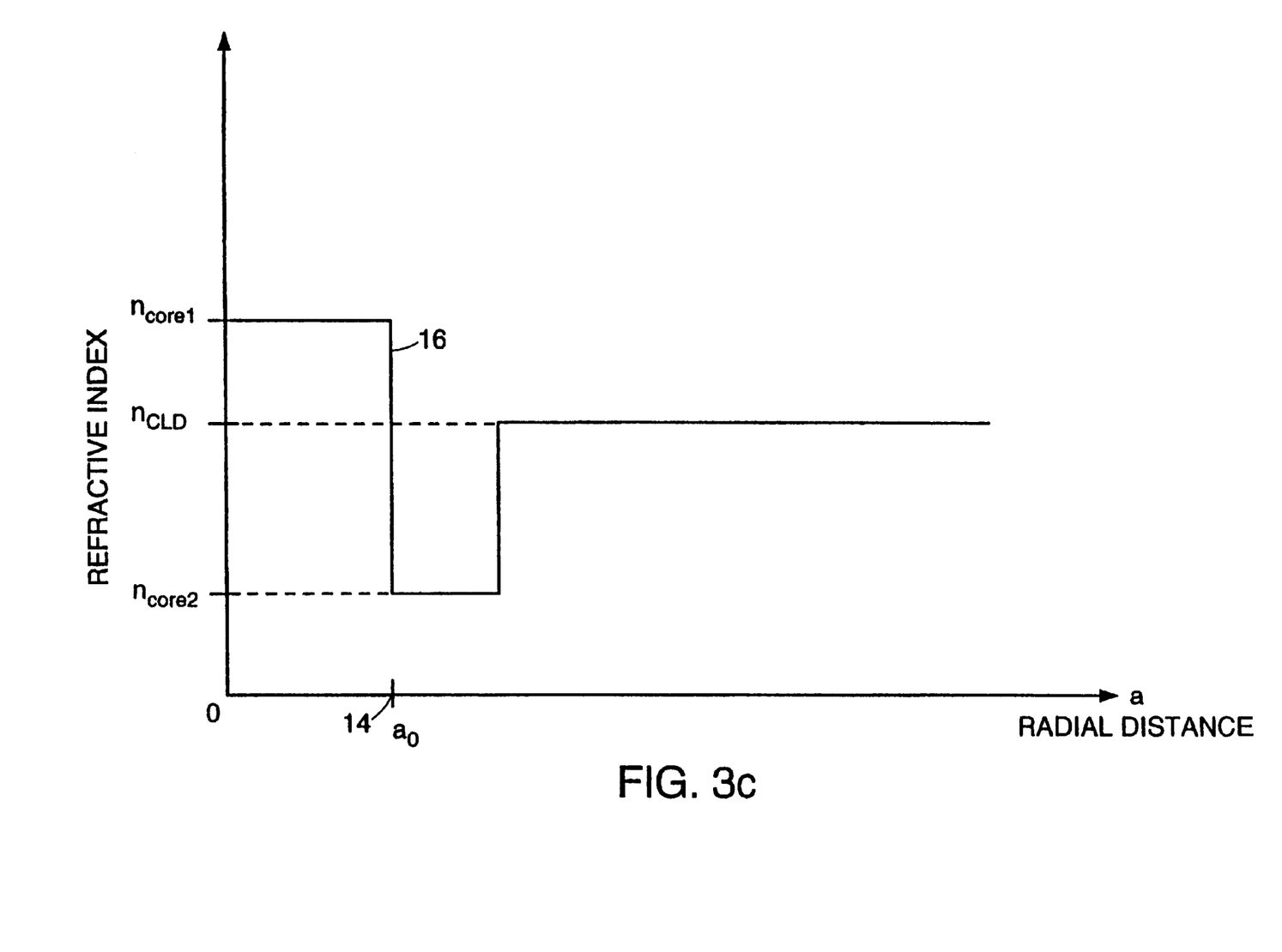
FIG. 3c shows an approximation of the variation in index of refraction with radial distance for one embodiment of a multiclad fiber approximated as a sharp decrease in refractive index according to the present invention.

Referring now to FIG. 3c, therein is shown an embodiment of the invention which includes a sharp change in index of refraction at $a_0$ 14. This discontinuity 16 is shown as a sharp decrease in refractive index in the core. The refractive index $n_{core1}$ is greater than the refractive index $n_{core2}$ in the embodiment shown in the figure. Discontinuity 16, in one embodiment, has the effect of scattering energy in the core of the fiber. Since mode $LP_{02}$ has substantially no energy at $a_0$ 14, it is minimally affected by discontinuity 16.

Figure 3D:
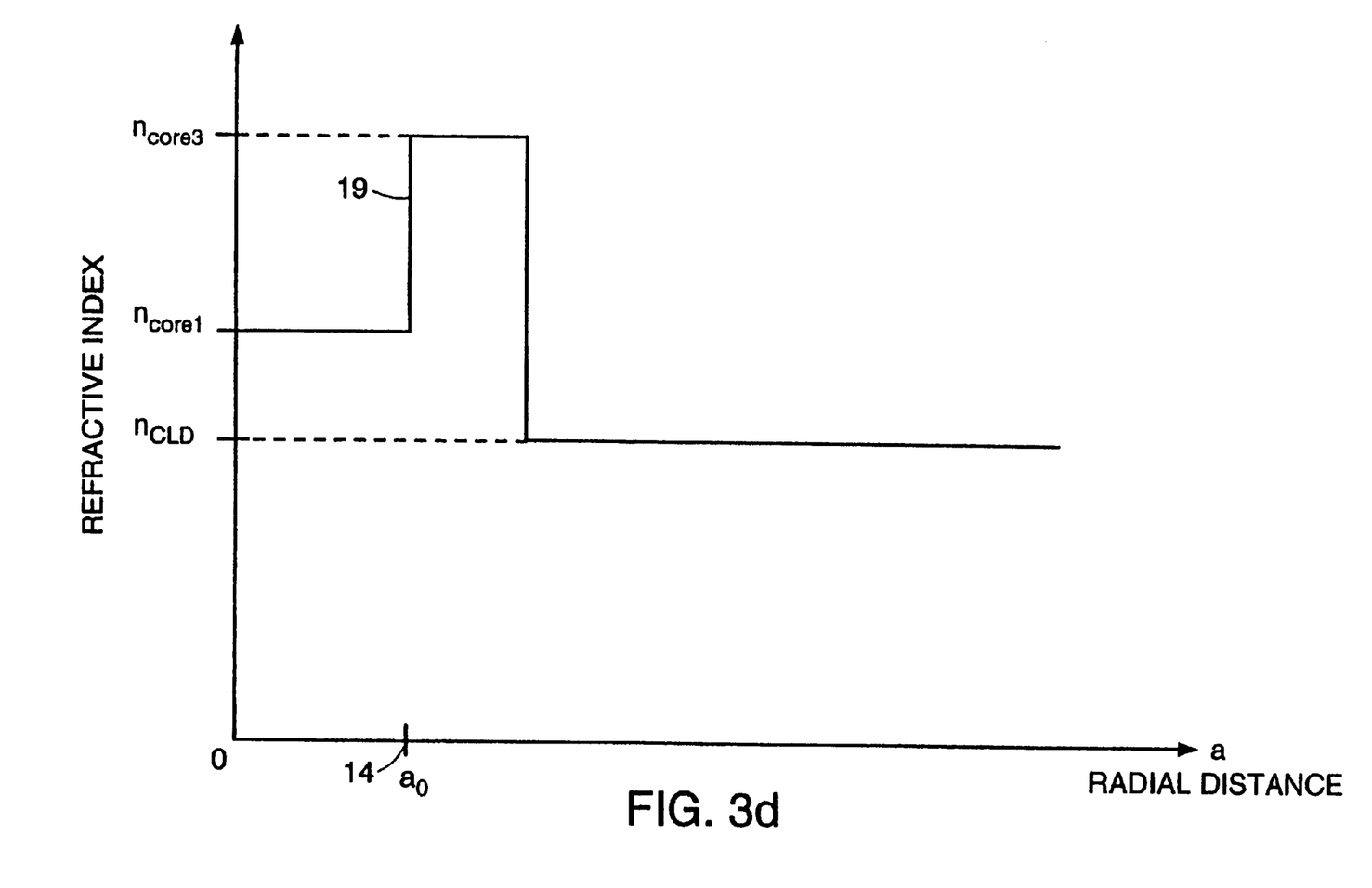
FIG. 3d shows an approximation of the variation in index of refraction with radial distance for one embodiment of a multiclad fiber approximated as a sharp increase in refractive index according to the present invention.

Referring now to FIG. 3d, therein is shown another embodiment of the invention which includes a sharp change in index of refraction at $a_0$ 14. This discontinuity 19 is shown as a sharp increase in refractive index in the core. The refractive index $n_{core1}$ is less than the refractive index $n_{core3}$ in the embodiment shown in the figure. Discontinuity 19, in this embodiment, has the effect of scattering energy in the core of the fiber. Since mode $LP_{02}$ has substantially no energy at $a_0$ 14, it is minimally affected by discontinuity 19.

Figure 3E:
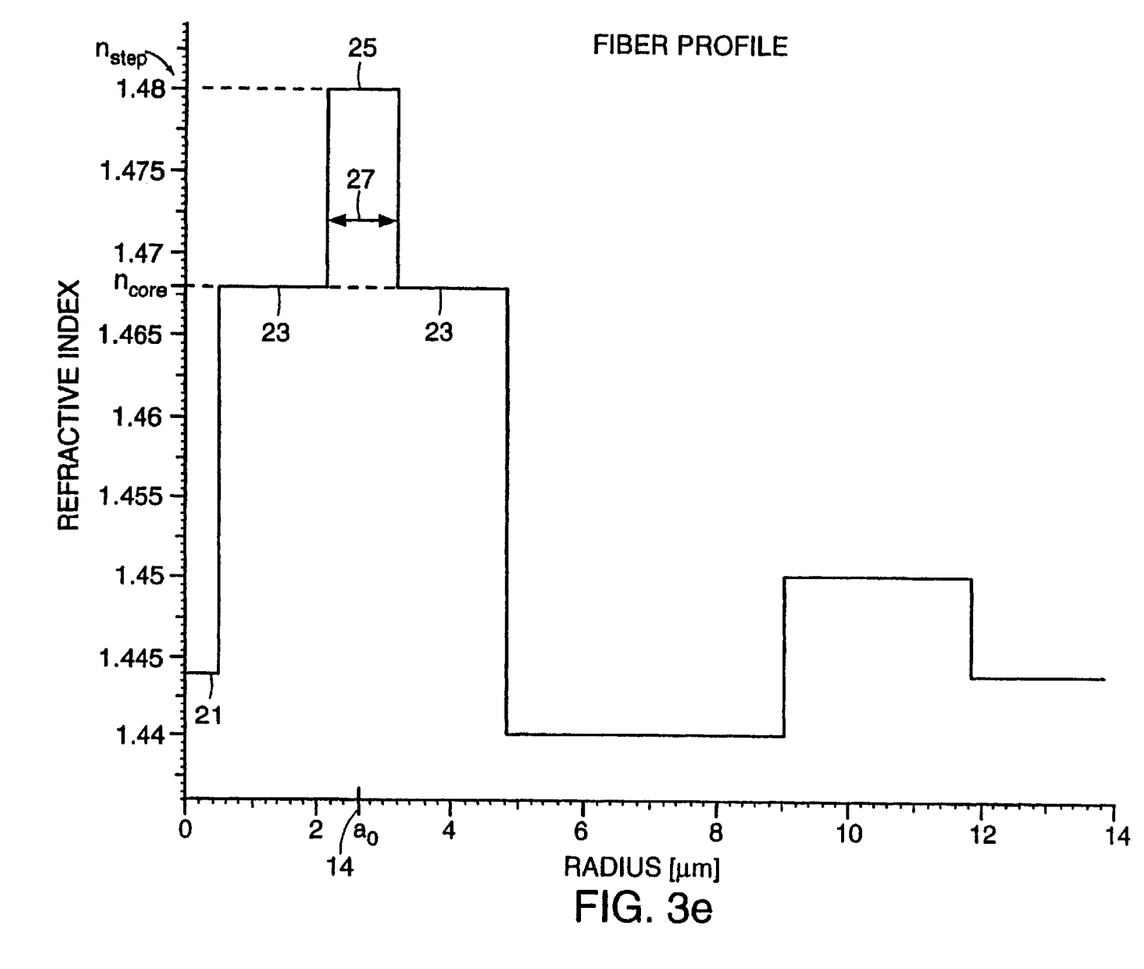
FIG. 3e shows an approximation of the variation in index of refraction with radial distance for one embodiment of a multiclad fiber approximated as a step profile with an additional index step according to the present invention.

Another implementation of this concept is illustrated in FIG. 3e, which shows a discontinuity in the refractive index in core 23 at the desired area. Step 25 is placed at the desired radial distance, and functions to scatter any energy located in the area of the step 25, which is herein shown to coincide with location $a_0$ 14. Width 27 of step 25 can be varied so as to optimize the effect of step 25. In one embodiment, width 27 is made as narrow as possible. As indicated in FIG. 3e, step 25 is shown with refractive index $n_{step}$, whereas core 23 is shown with refractive index $n_{core}$. In this embodiment, step 25 has an index of refraction which is greater than the refractive index of the core 23. Step 25, in one embodiment can be manufactured using an appropriate dopant. The effect of step 25, in one embodiment, is to scatter any energy found in the region of width 27 at radius $a_0$ 14. As discussed earlier, mode $LP_{02}$ has practically no energy at radius $a_0$ 14. Other modes have significant energy at $a_0$ 14 and those modes have energy which will be scattered by step 25.

Although dip 21 at the core center is not required by the present invention, it does have purpose which will become clear to one skill in the art. Dip 25, in one embodiment, functions to better discriminate the modes from each other in the waveguide. In another embodiment, dip 21 serves to force mode $LP_{01}$, further away from the center of the core towards the region of $a_0$ 14. This has the effect of improving the attenuation of mode $LP_{01}$, since more of its energy is now in the attenuating region of $a_0$ 14. Therefore, in this embodiment, dip 21 is used to increase the effect of the absorption or scattering of mode $LP_{01}$ by increasing its intensity at $a_0$ 14.

Figure 3F:
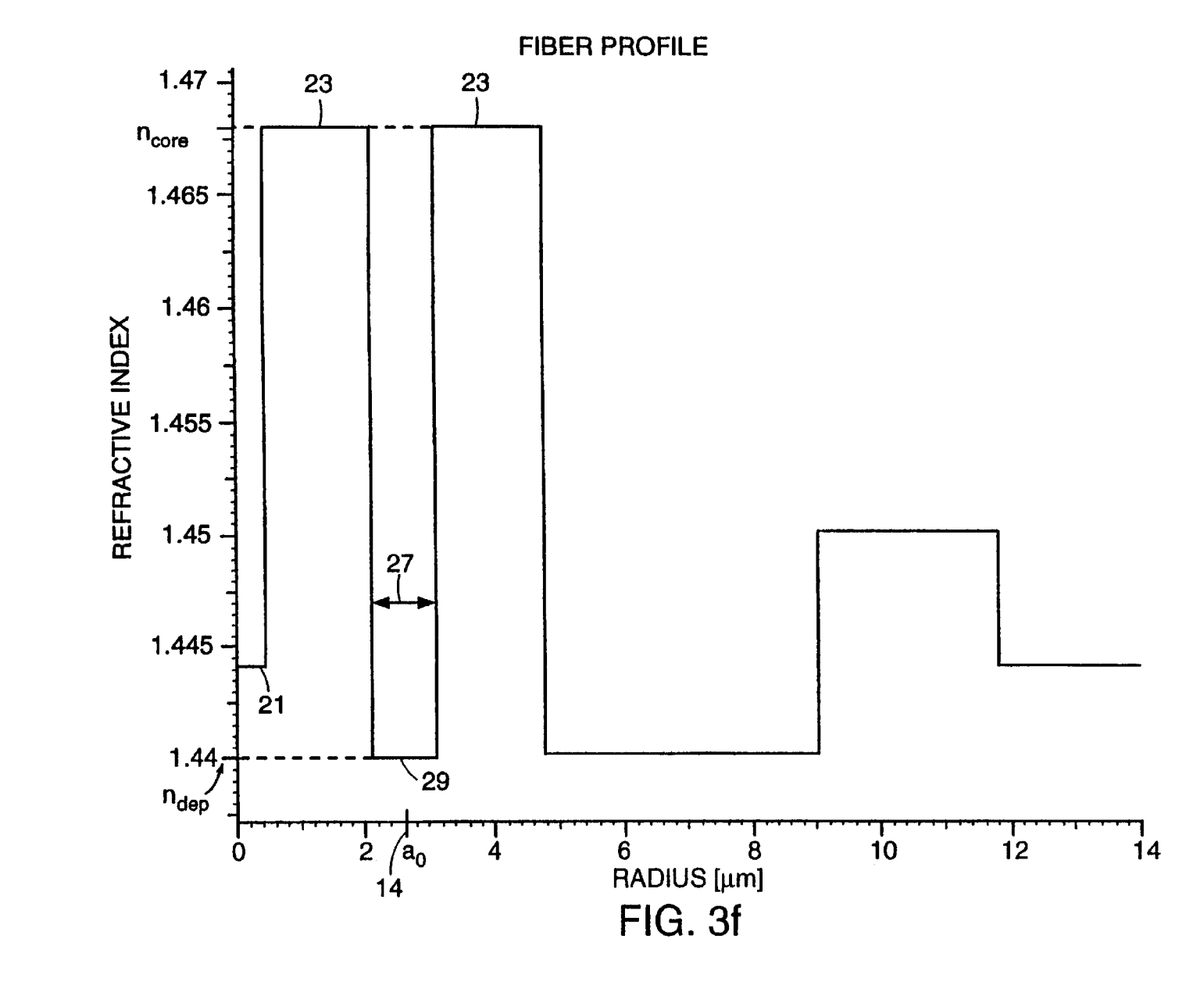
FIG. 3f shows an approximation of the variation in index of refraction with radial distance for one embodiment of a multiclad fiber approximated as a step profile with an additional index depression according to the present invention.

Referring now to FIG. 3f, therein is illustrated a discontinuity in the refractive index $n_{core}$ of core 23 consisting of a dip or depression 29 in the region of core 23. The refractive index $n_{dep}$ of the dip or depression 29 is less than the core refractive index $n_{core}$. The depression 29 of refractive index $n_{dep}$ is placed at the desired radial distance $a_0$ 14, and functions to direct any energy in this region to the adjacent regions. As described above, the region is chosen as consisting primarily of unwanted energy, and thus the unwanted energy is directed into the desired regions. Width 27 of depression 29 as discussed above, can be varied so as to optimize the effect of depression 29. In one embodiment, width 27 is made as narrow as possible. This will have the effect of attenuating any modes that have energy in unwanted areas.

Figure 4:
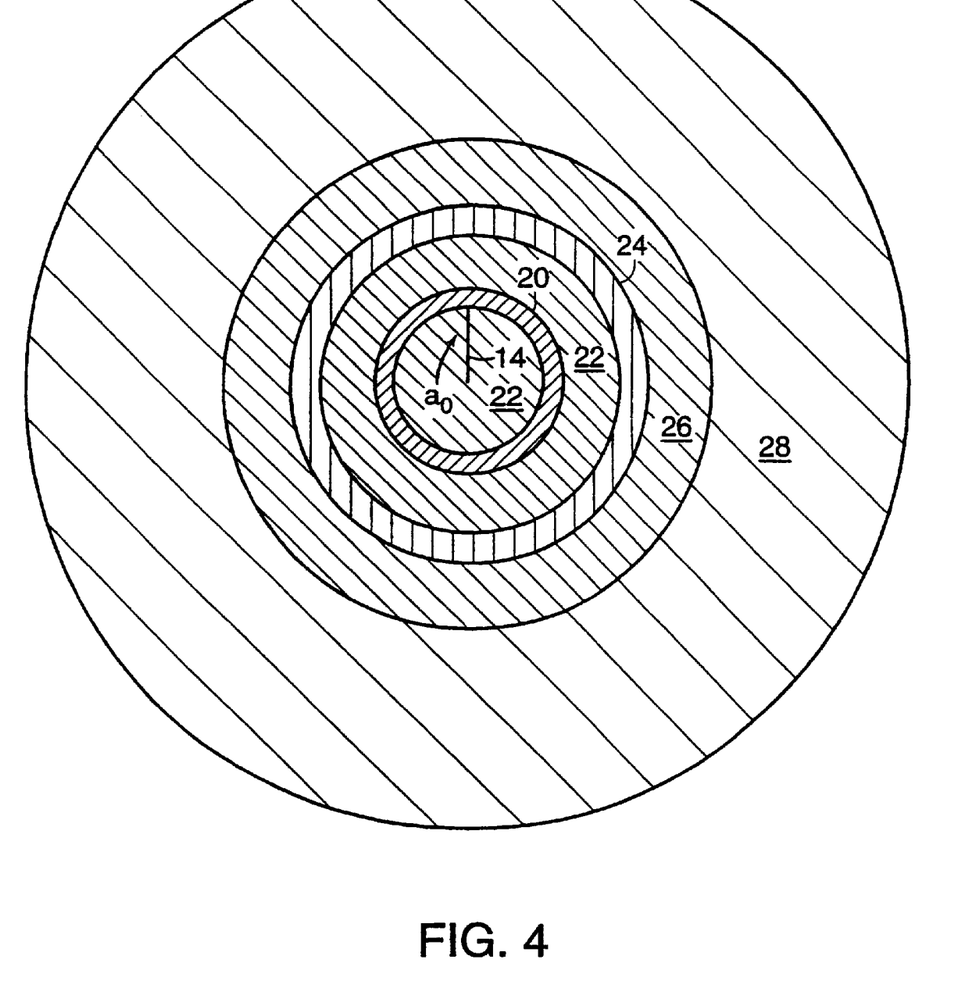
FIG. 4 is a cross-sectional view of one embodiment of an optical fiber constructed in accordance with the principles of the invention.

Referring to FIG. 4, therein is shown an embodiment of a waveguide according to the present invention. FIG. 4 shows a cross-sectional view of one embodiment of an optical fiber of the invention. Absorbing or scattering annulus 20 is positioned at a radial distance $a_0$ 14 from the center of the fiber. This corresponds to the location in which the $LP_{02}$ mode (12) has substantially zero intensity. Various index regions of this embodiment are shown including the region of core 22, the region of first cladding 24, the region of second cladding 26, and the region of the third cladding 28. This embodiment is only an example of one possible cross-section of a fiber according to the invention. It should be appreciated that other fiber profiles could be used within the scope of the invention. Furthermore, absorbing or scattering annulus 20 may vary in both width and radius, and may be located anywhere within the region defined by the core index 22. In addition, the absorbing or scattering annulus 20 may also surround the region of core index 22 (24, 26). In another embodiment, absorbing or scattering annulus 20 is designed to be thin so as not to substantially diverge from location $a_0$ 14 and, hence, unintentionally attenuate the desired mode. In yet another embodiment, multiple absorbing or scattering annuli, or a combination of both may be used in the core and/or the cladding of the fiber. The absorbing annulus 20, in another embodiment, may be of any absorbing material, and may comprise titanium, boron, Erbium or any other absorbing material. Scattering materials can be used as long as special care is made to reduce scattering from the desired mode to undesired modes. Below the desired threshold, this can be accomplished by reducing the scattering concentration or by using scattering at large angles.

Figure 5:
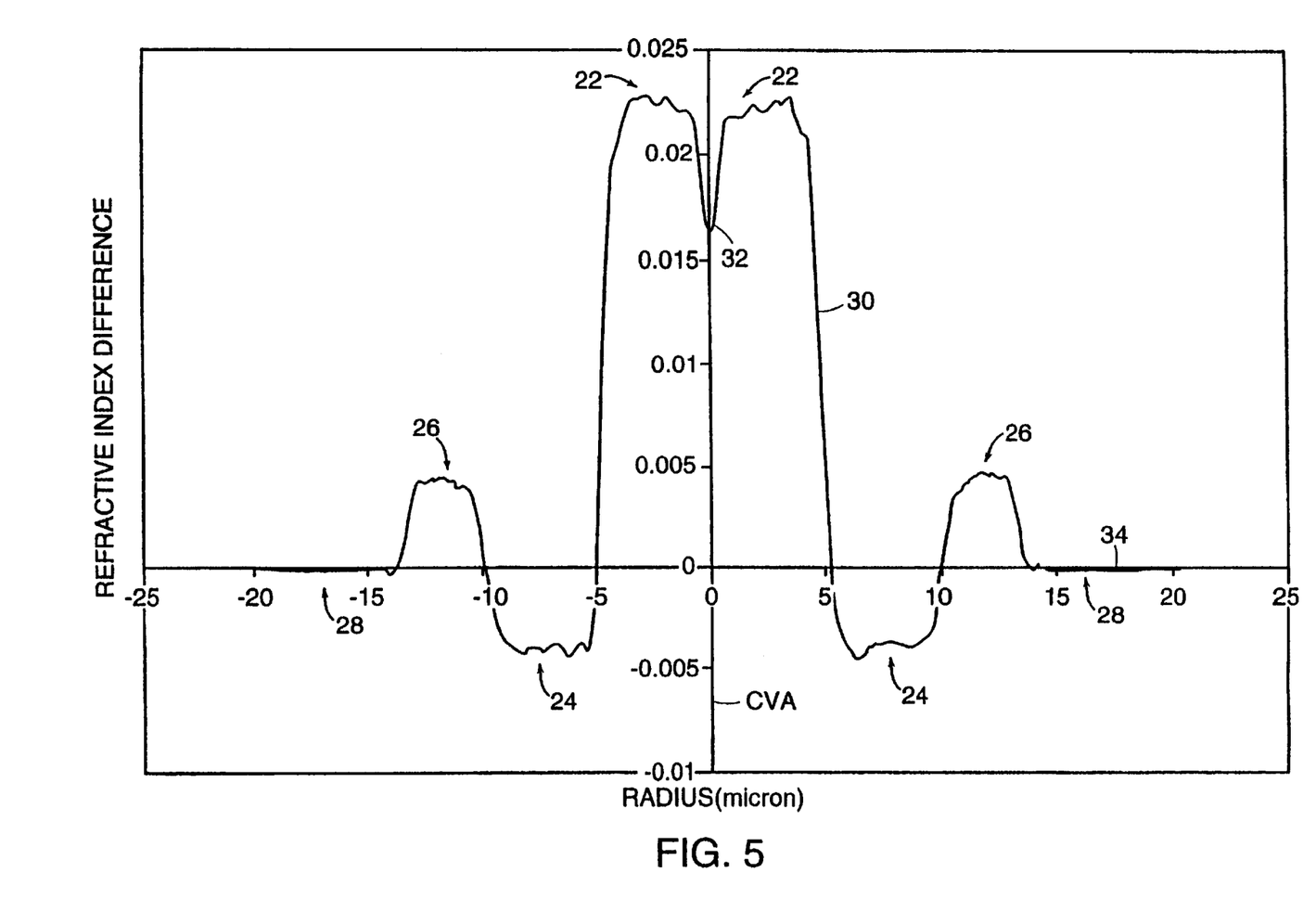
FIG. 5 shows the actual variation in index of refraction with radial distance according to one embodiment of the present invention.

FIG. 5 is a measurement of the actual variation in index of refraction with radial distance according to one embodiment of the present invention including an absorbing annulus 20. The actual index profile 30 is shown. The profile 30, is actually the index difference from the nominal index 34 of the cladding. The center vertical axis (CVA) in FIG. 5 corresponds to the center of the fiber. The dip 32 shown in the region of the core index 22 is a by-product of the manufacturing process. The region of the annulus 20 exhibits a negligible dip in the index of refraction. The region of the first cladding index 24, the region of the second cladding index 26, and the region of the next cladding index 28 are also shown. Similar results can be achieved for another embodiment which includes a scattering annulus, or a conductive material dopant annulus.

Figure 6:
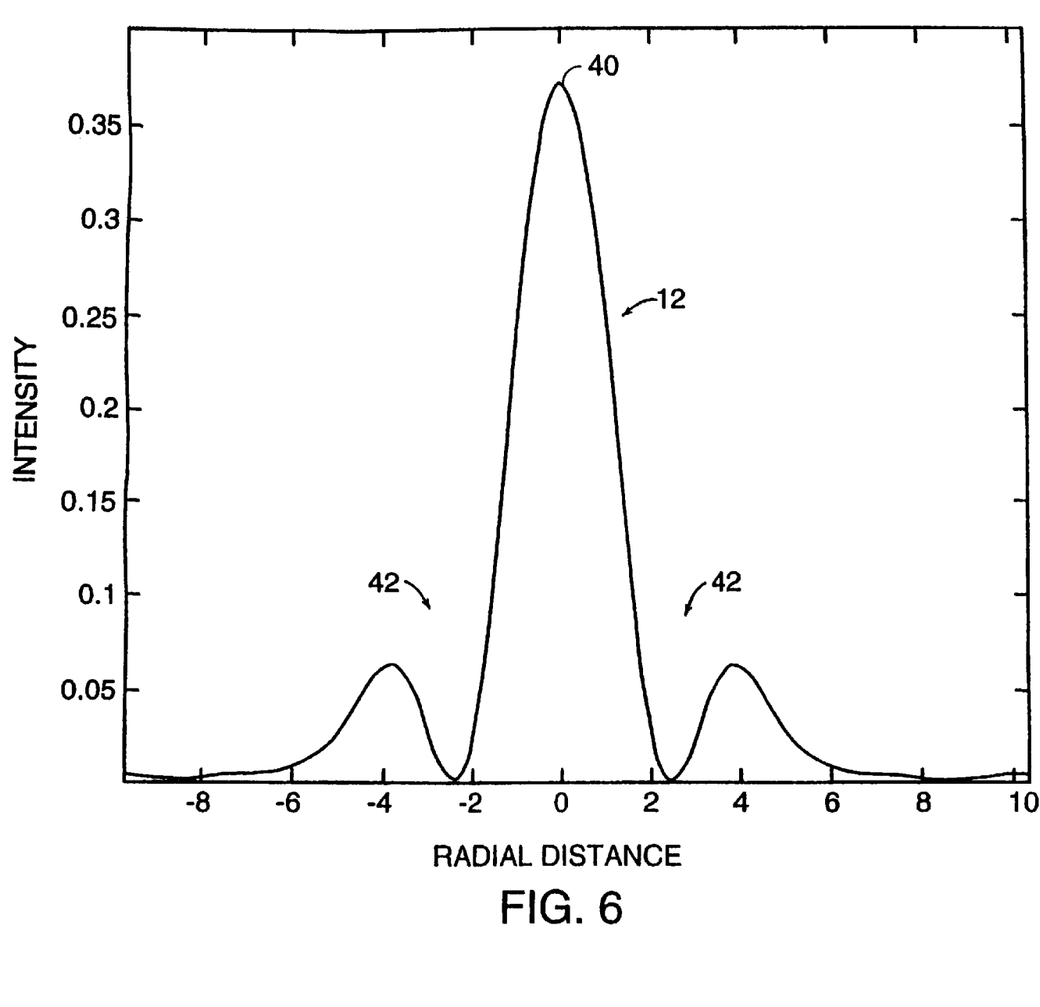
FIG. 6 shows the $LP_{02}$ mode distribution in an embodiment of a fiber according to the present invention.

FIG. 6 illustrates the $LP_{02}$ mode (12) distribution in an embodiment of the fiber presented in FIG. 5. In FIG. 6 the horizontal axis is the radial distance in microns and the vertical axis is the intensity in arbitrary units. In this embodiment, the $LP_{02}$ mode (12) has maximum intensity 40 at the center of the fiber and a null 42 in energy at a distance of approximately 2.25 microns from the center of the fiber.

Figure 7:
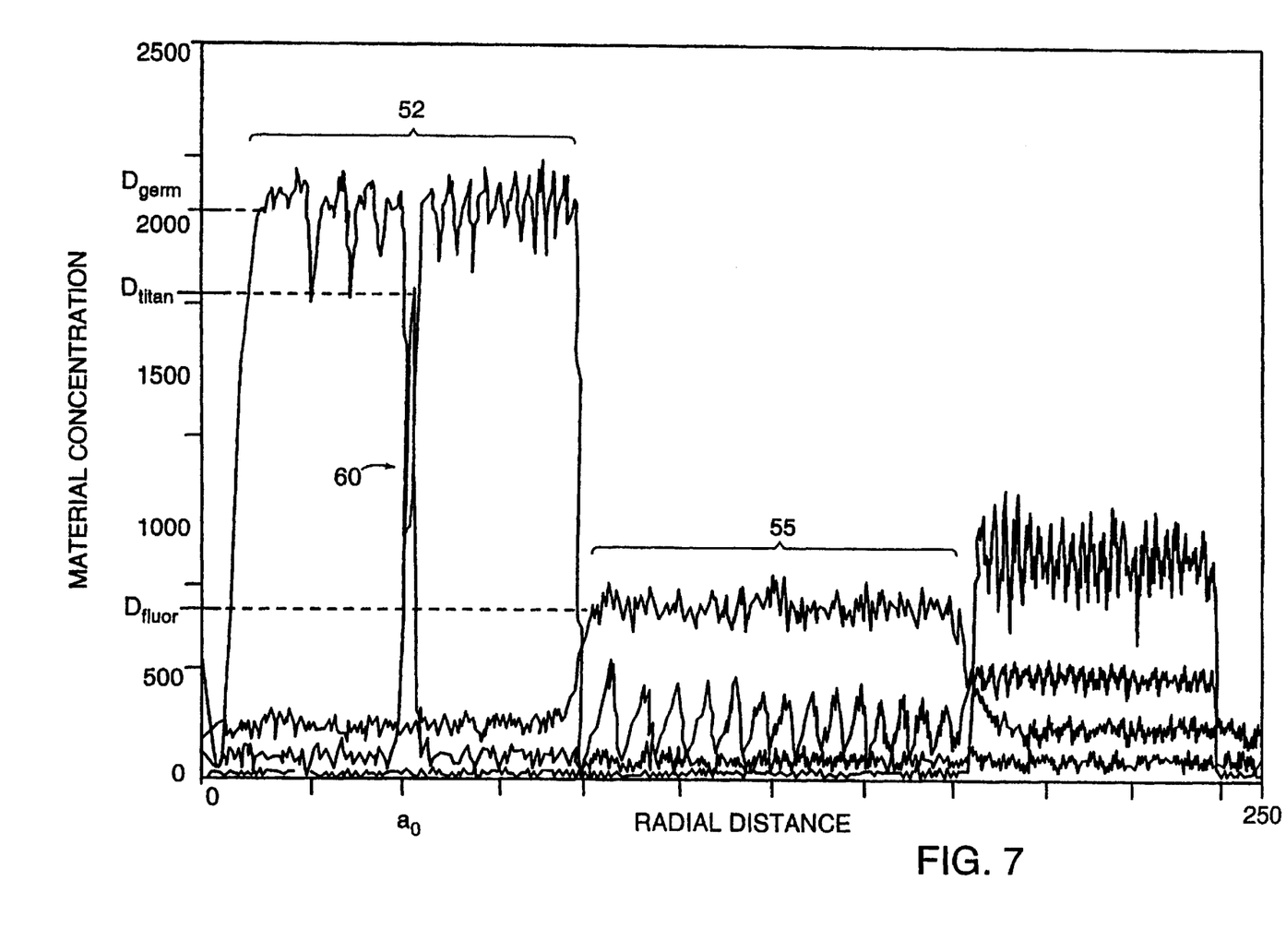
FIG. 7 illustrates actual measurements of various materials deposited in an embodiment of a fiber manufactured according to the present invention.

FIG. 7 illustrates the various materials deposited in the fiber as they were measured in the pre-form used to make an embodiment of the fiber utilizing an absorbing annulus. The horizontal axis represents radial distance where the left side of the diagram represents the center of the fiber and the right side is the cladding. The vertical axis represents material concentration in arbitrary units. The core 52 is doped with a germanium concentration $D_{germ}$ which increases the refractive index of the core of the fiber. The first cladding region 55 is doped with fluoride materials $D_{fluor}$ used to reduce refractive index. The absorbing annulus 60 comprises titanium $D_{titan}$ which was deposited in a ring in the core at radius $a_0$ in order to attenuate undesired modes, by increasing the local absorption coefficient. It can be seen in this diagram that, at the ring location $a_0$ where the titanium concentration $D_{titan}$ was high, the germanium concentration $D_{germ}$ was reduced in order to maintain a near constant refractive index in the core region.

The absorbing material that comprises the absorbing annulus, in one embodiment, can be introduced into the optical fiber pre-form using conventional known technology. Preferably, the absorbing material has a low scattering coefficient. For example, titanium or boron can be used. Low scattering by the absorber material reduces energy coupling from the $LP_{02}$ mode into other modes. The width of the absorbing ring in one embodiment is preferably as narrow as possible in order to reduce losses to the $LP_{02}$ mode.

Figure 8:
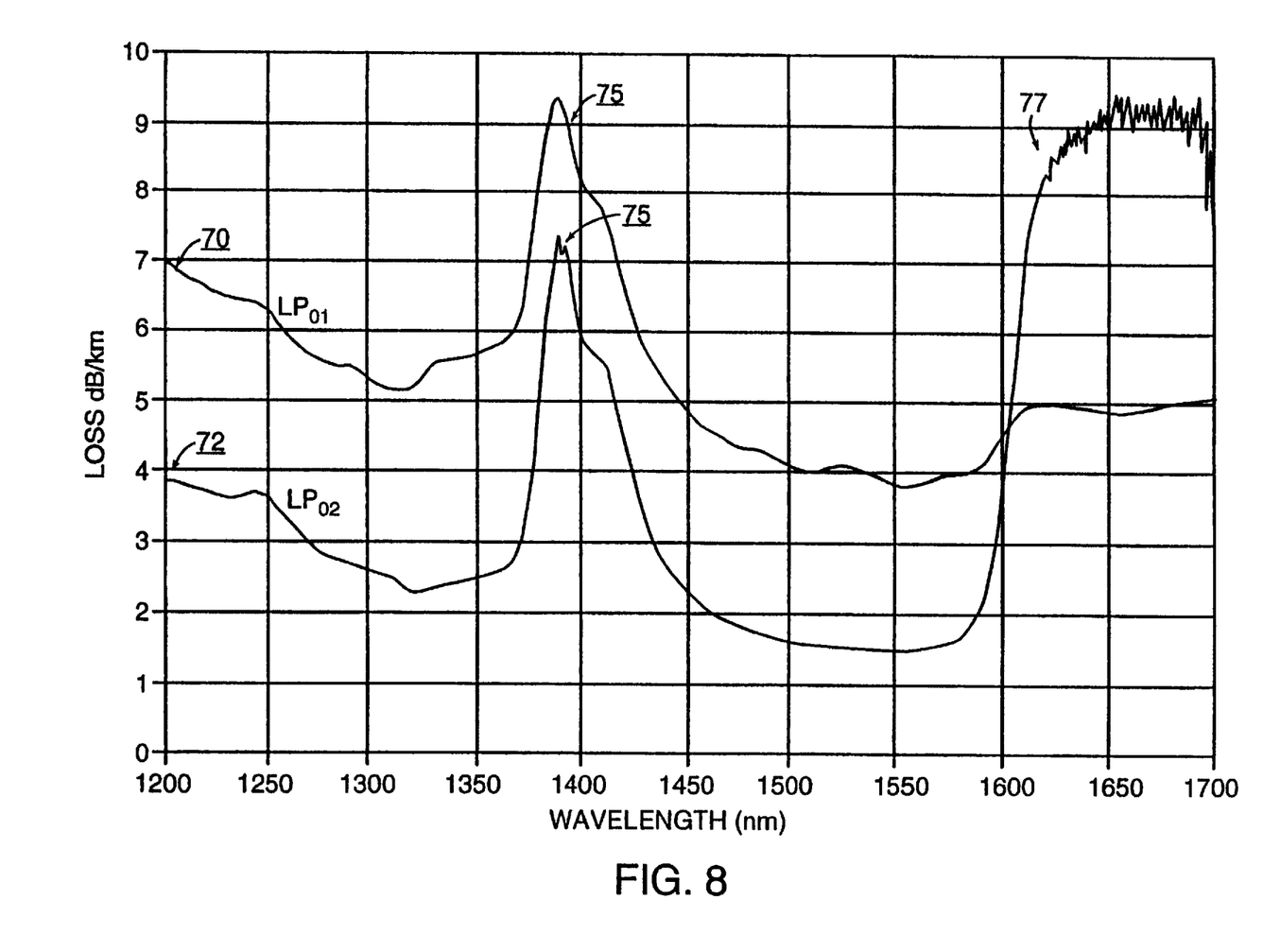
FIG. 8 shows an actual measurement of the attenuation of the $LP_{02}$ mode compared with the measured attenuation of the $LP_{01}$ mode for one embodiment of the present invention.

FIG. 8 is the measured attenuation of the $LP_{02}$ mode for one embodiment of the present invention utilizing an absorbing annulus. In FIG. 8, the horizontal axis represents the wavelength in nanometers, and the vertical axis represents the loss in dB per kilometer. The loss of the $LP_{01}$ mode with respect to wavelength is shown by line 70. The loss of the $LP_{02}$ mode with respect to wavelength is shown by line 72. There is significant increase of loss for these modes around 1400 nanometers (75) due to OH absorption in the fiber. There is another increase in loss for the $LP_{02}$ mode around 1600 nanometers due to cut off of this mode (77). However, in the typical operating wavelengths, between 1525 and 1565, the loss in the fiber of the LP02 mode is lower than in any other mode.

From these results, it is observed that the relative intensity of the $LP_{02}$ mode will remain constant or even improve as it propagates through the fiber. Therefore, the fiber is suitable for dispersion compensation applications. For example, the dispersion of an embodiment of this fiber was measured to be in the order of 250 psa/nm.km at 1550 nm.

The absorption coefficient for each mode with respect to the absorbing annulus can be calculated by overlapping the intensity distribution of the mode with the absorbing annulus. As an example of one embodiment, an absorbing annulus comprising boron having a width of 0.5 microns and located at a radial distance of 2.3 microns from the fiber center and having a local absorption of 30 dB/km increases the loss of the $LP_{02}$ mode by 0.11 dB/km. The undesired modes have a much higher loss:

$LP_{01}$ 5.26 dB/km more loss
$LP_{11}$ 5 dB/km more loss
$LP_{21}$ 5 dB/km more loss The calculation of the above values assumed a wavelength of 1550 nm. Changing the wavelength by ±50 nm caused low changes in losses of less than 0.001 dB/km.

It should be appreciated to those skilled in the art that the invention could be used to isolate any desired high even mode including the $LP_{02}$, $LP_{03}$ and $LP_{04}$ modes. It should also be appreciated that multiple absorbing annuli may be used without departing from the spirit or scope of the invention.

This fiber with the absorbing annulus can be applied in dispersion compensating fibers, transmission fibers or Erbium doped fiber amplifiers (EDFAs) using the $LP_{02}$ mode for example. The absorbing annulus can be applied to an optical fiber regardless of its refractive index profile. Similar results may be achieved utilizing a scattering annulus consisting of scattering material or a conductive material dopant. Placing an additional step index in the desired area, or an additional index depression or well, will also achieve similar results. A combination of an annulus and a step or depression may also be utilized.

Having described and shown the preferred embodiments of the invention, it will now become apparent to one of skill in the art that other embodiments incorporating the concepts may be used and that many variations are possible which will still be within the scope and spirit of the claimed invention. It is felt, therefore, that these embodiments should not be limited to disclosed embodiments but rather should be limited only by the spirit and scope of the following claims.

What is claimed is:

1. An optical waveguide, comprising:
   a core for supporting a plurality of modes wherein a predetermined one of said modes is a desired high order mode; and
   at least one annulus disposed at a position at which said desired high order mode has substantially no energy,
   said annulus attenuating said desired high order mode to a lesser degree than any other mode in said plurality of modes and whereby said optical waveguide is optimized to propagate substantially a single high order mode.

2. The optical waveguide of claim 1 wherein said desired high order mode comprises an even high order mode.

3. The optical waveguide of claim 2 wherein said even high order mode comprises the $LP_{02}$ mode.

4. The optical waveguide of claim 1 wherein each of said at least one annulus comprises an absorbing dopant material, a scattering dopant material, or a conductive dupont material.

5. The optical waveguide of claim 1 wherein at least one of said at least one annulus is disposed in said core.

6. The optical waveguide of claim 5 wherein said core has a substantially uniform refractive index.

7. The optical waveguide of claim 5 wherein a refractive index of said at least one annulus is greater than a refractive index of said core.

8. The optical waveguide of claim 5 wherein a refractive index of said at least one annulus is less than a refractive index of said core.

9. The optical waveguide of claim 1 wherein at least one of said at least one annulus surrounds said core.

10. The optical waveguide of claim 1 wherein each of said at least one annulus has a refractive index and wherein at least a portion of said core has a refractive index, said refractive index of each of said at least one annulus being different than said refractive index of said at least a portion of said core.

11. An optical waveguide, comprising:
    a core for supporting a plurality of modes wherein a predetermined one of said modes is a desired high order mode and all other modes of said plurality of modes are undesired modes; and
    at least one region having a nominal discontinuity in the refractive index disposed at a position at which said desired high order mode has substantially no energy,
    said region attenuating said undesired modes to a greater degree than said desired mode and whereby said optical waveguide is optimized to propagate substantially a single high order mode.

12. The optical waveguide of claim 11 wherein said desired high order mode comprises an even high order mode.

13. The optical waveguide of claim 12 wherein said even high order mode comprises the $LP_{02}$ mode.

14. The optical waveguide of claim 11 wherein at least one of said at least one region is disposed in said core.

15. The optical waveguide of claim 11 wherein said refractive index of said at least one region is different than a refractive index of at least a portion of said core.

16. The optical waveguide of claim 15 wherein said refractive index of said at least one region is higher than said refractive index of said portion of said core.

17. The optical waveguide of claim 15 wherein said refractive index of said at least one region is lower than said refractive index of said portion of said core.

18. The optical waveguide of claim 11 wherein at least one of said at least one region surrounds said core.

19. The optical waveguide of claim 11 wherein each of said at least one region comprises a refractive index change, a refractive index step, or a refractive index depression.

20. A method of selective mode attenuation in an optical waveguide comprising:

providing a core;

transmitting an optical signal including a plurality of modes through said core, wherein a predetermined one of said modes is a desired high order mode and all other modes are undesired modes; and attenuating said undesired modes to a greater degree than said desired mode at a position at which said desired mode has substantially no energy;

whereby said optical waveguide is optimized to propagate substantially a single high order mode.

21. The method of claim 20 wherein said attenuating step comprises attenuating in at least one region in said core.

22. The method of claim 20 wherein said attenuating step comprises attenuating in at least one region surrounding said core.

* * * * *